(12) United States Patent
Plondke et al.

(10) Patent No.: US 7,984,281 B2
(45) Date of Patent: Jul. 19, 2011

(54) SHARED INTERRUPT CONTROLLER FOR A MULTI-THREADED PROCESSOR

(75) Inventors: Erich James Plondke, Austin, TX (US); Lucian Codrescu, Austin, TX (US); Muhammad Ahmed, Dallas, TX (US); William Anderson, Austin, TX (US); Suresh K. Venkumahanti, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/954,615

(22) Filed: Dec. 12, 2007

(65) Prior Publication Data

US 2008/0091867 A1 Apr. 17, 2008

Related U.S. Application Data

(63) Continuation-in-part of application No. 11/253,906, filed on Oct. 18, 2005.

(51) Int. Cl.
*G06F 9/00* (2006.01)

(52) U.S. Cl. .......................... 712/244; 710/260; 710/261

(58) Field of Classification Search .................. 712/244; 710/260, 261
See application file for complete search history.

(56) References Cited

U.S. PATENT DOCUMENTS

| | | | |
|---|---|---|---|
| 4,689,739 A | 8/1987 | Federico | |
| 4,901,307 A | 2/1990 | Gilhousen et al. | |
| 5,103,459 A | 4/1992 | Gilhousen et al. | |
| 5,193,187 A * | 3/1993 | Strout et al. | 710/261 |
| 5,305,455 A * | 4/1994 | Anschuetz et al. | 718/100 |
| 5,410,708 A * | 4/1995 | Miyamori | 710/264 |
| 5,524,250 A * | 6/1996 | Chesson et al. | 712/228 |
| 5,805,922 A * | 9/1998 | Sim et al. | 710/5 |
| 5,848,278 A * | 12/1998 | Sakai | 710/260 |
| 6,032,245 A | 2/2000 | Georgiou et al. | |
| 6,061,710 A * | 5/2000 | Eickemeyer et al. | 718/107 |
| 6,108,781 A * | 8/2000 | Jayakumar | 713/2 |
| 6,163,829 A | 12/2000 | Greim et al. | |
| 6,233,599 B1 * | 5/2001 | Nation et al. | 718/102 |
| 6,253,304 B1 * | 6/2001 | Hewitt et al. | 712/6 |
| 6,260,057 B1 * | 7/2001 | Eykholt et al. | 718/102 |
| 6,317,820 B1 | 11/2001 | Shiell et al. | |

(Continued)

FOREIGN PATENT DOCUMENTS

WO    02082278    10/2002

OTHER PUBLICATIONS

Scott Rosenthal "Interrupts might seem basic, but many programmers still avoid them", SLTF Consulting, May 1995.*

(Continued)

*Primary Examiner* — Idriss N Alrobaye
(74) *Attorney, Agent, or Firm* — Peter M. Kamarchik; Nicholas J. Pauley; Jonathan T. Velasco

(57) ABSTRACT

A multi-threaded processor is disclosed that includes a sequencer adapted to provide instructions associated with one or more threads of a multi-threaded processor. The sequencer includes an interrupt controller adapted to receive one or more interrupts and to selectively allow a first thread of the one or more threads to service at least one interrupt. The interrupt controller includes logic to preclude a second thread of the one or more threads from responding to the at least one interrupt.

3 Claims, 5 Drawing Sheets

U.S. PATENT DOCUMENTS

| | | | |
|---|---|---|---|
| 6,381,676 B2 * | 4/2002 | Aglietti et al. | 711/133 |
| 6,480,818 B1 * | 11/2002 | Alverson et al. | 703/26 |
| 6,839,792 B2 | 1/2005 | Feldstein et al. | |
| 6,848,097 B1 * | 1/2005 | Alverson et al. | 717/124 |
| 6,971,103 B2 * | 11/2005 | Hokenek et al. | 718/107 |
| 7,065,633 B1 * | 6/2006 | Yates et al. | 712/227 |
| 7,120,762 B2 * | 10/2006 | Rajwar et al. | 711/150 |
| 7,120,783 B2 * | 10/2006 | Fotland et al. | 712/228 |
| 7,124,283 B2 | 10/2006 | Yamada et al. | |
| 7,203,823 B2 * | 4/2007 | Albuz et al. | 712/229 |
| 2001/0052053 A1 * | 12/2001 | Nemirovsky et al. | 711/138 |
| 2002/0103847 A1 * | 8/2002 | Potash | 709/107 |
| 2002/0144004 A1 * | 10/2002 | Gaur et al. | 709/310 |
| 2002/0161957 A1 * | 10/2002 | Comeau et al. | 710/260 |
| 2003/0041173 A1 * | 2/2003 | Hoyle | 709/248 |
| 2003/0154234 A1 * | 8/2003 | Larson | 709/107 |
| 2003/0225955 A1 | 12/2003 | Feldstein et al. | |
| 2004/0003204 A1 * | 1/2004 | Yamada et al. | 712/209 |
| 2004/0073910 A1 * | 4/2004 | Hokenek et al. | 719/310 |
| 2005/0050305 A1 | 3/2005 | Kissell | |
| 2005/0102458 A1 * | 5/2005 | Ober et al. | 710/260 |
| 2006/0037020 A1 * | 2/2006 | Accapadi et al. | 718/102 |
| 2006/0130061 A1 * | 6/2006 | Bauer et al. | 718/100 |
| 2006/0206902 A1 | 9/2006 | Jamil et al. | |
| 2006/0218559 A1 | 9/2006 | Ahmed | |
| 2007/0088938 A1 | 4/2007 | Codrescu et al. | |

OTHER PUBLICATIONS

Academic Press Dictionary of Science and Technology. Ocford: Elsevier Science and Technology. 1992.

International Search Report-PCT/US08/086435, International Search Authority-European Patent Office-Jun. 8, 2009.

Microsoft Computer Dictionary. Fifth Edition, May 25, 2002.

Microsoft Press Computer Dictionary, 2nd Edition; Joanne Woodcock, Senior Contributor, Oct. 1993.

Modern Dictionary of Electronics, 6th Edition, Jul. 1996, Rudolf F. Graf.

Written Opinion-PCT/US08/086435, International Search Authority-European Patent Office-Jun. 8, 2009.

European Search Report and European Search Opinion—EP08006319, Search Authority—Munich, Oct. 27, 2009.

* cited by examiner

SHARED INTERRUPT CONTROLLER FOR A MULTI-THREADED PROCESSOR

I. CROSS-REFERENCE TO RELATED APPLICATION(S)

This application claims priority from and is a continuation-in-part of U.S. patent application Ser. No. 11/253,906, entitled "SHARED INTERRUPT CONTROL METHOD AND SYSTEM FOR A DIGITAL SIGNAL PROCESSOR," filed on Oct. 18, 2005, which is incorporated herein by reference in its entirety.

II. FIELD

The present disclosure is generally related to a shared interrupt controller for a multi-threaded processor.

III. DESCRIPTION OF RELATED ART

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can include software functionality, such as a web browser application, that can be used to access the Internet. As such, these wireless telephones can include significant computing capabilities.

Digital signal processors (DSPs) are frequently used in portable personal computing devices, such as wireless telephones. Such DSPs can be utilized to provide video and audio functions, to process received data, or to perform other functions. Such DSPs can employ multi-threaded architectures, which can process multiple program instruction threads and can include parallel execution units.

DSPs can include an interrupt handler to receive interrupt signals from executed instructions, peripheral devices, or other circuit elements. Such interrupt signals can trigger a temporary suspension of a DSP process responsive to a detected event. Unless each thread of a DSP includes a dedicated interrupt handler or controller, servicing of interrupts can present additional scheduling complexity.

IV. SUMMARY

In a particular illustrative embodiment, a multi-threaded processor is disclosed that includes a sequencer adapted to provide instructions associated with one or more threads of the multi-threaded processor. The sequencer includes an interrupt controller adapted to receive one or more interrupts and to selectively allow a first thread of the one or more threads to service at least one interrupt of the one or more interrupts. The interrupt controller includes a logic circuit to preclude a second thread of the one or more threads from responding to the interrupt after the interrupt is selected for service by the first thread.

In another particular illustrative embodiment, a processor includes a global interrupt register that is responsive to one or more interrupt sources to receive one or more interrupts. The global interrupt register is accessible by each thread of the multi-threaded processor to service the one or more interrupts. Interrupt logic is coupled to the global interrupt register to determine that an interrupt is being serviced by a thread of the multi-threaded processor and to prevent access to the interrupt by other threads based on a determination that the interrupt is being serviced.

In still another particular illustrative embodiment, a method of controlling interrupts in a multi-threaded processor includes receiving an interrupt at a sequencer associated with the multi-threaded processor. The method further includes preventing access to the interrupt by a second thread after determining the interrupt is being serviced by a first thread of the plurality of threads. The sequencer includes a global interrupt register accessible to a plurality of threads of the multi-threaded processor and the sequencer includes an interrupt control circuit.

In yet another particular illustrative embodiment, a processing device is disclosed that includes means for receiving an interrupt at a sequencer associated with a multi-threaded processor. The sequencer includes a global interrupt register accessible to a plurality of threads and includes an interrupt control circuit. The processing device also includes means for preventing access to the interrupt by a second thread after determining the interrupt is being serviced by a first thread of the plurality of threads.

In another particular illustrative embodiment, a wireless communications device is disclosed that includes a transceiver to communicate with a communications network and a memory including a plurality of instructions executable by a processor. The processor is coupled to the transceiver and has access to the memory. The processor includes a plurality of threads adapted to execute selected instructions from the plurality of instructions and a sequencer adapted to retrieve and provide the selected instructions to the plurality of threads. The sequencer includes a global interrupt register accessible to each thread of the plurality of threads and includes an interrupt controller coupled to the global interrupt register. The interrupt controller is adapted to determine when a thread of the plurality of threads is servicing an interrupt and to utilize the global interrupt register to prevent access to the interrupt by other threads of the plurality of threads.

In still another particular illustrative embodiment, a processor is disclosed that includes a first configuration register indicating an interrupt logic level and a second configuration register indicating an interrupt trigger. The processor also includes an automatic disable interrupt register including a plurality of bits, where each bit of the plurality of bits corresponds to a particular interrupt. The processor further includes processing logic to provide an interrupt to a first thread of a multi-threaded processor including a plurality of execution threads based on the interrupt logic level, the interrupt trigger, and the bit corresponding to the particular interrupt. The processing logic sets the bit corresponding to the particular interrupt when the particular interrupt is being serviced by the first thread and prevents access by other threads of the plurality of execution threads while the particular interrupt is being serviced by the first thread.

One particular advantage provided by embodiments of the global interrupt register and associated logic is provided in that bits of the global interrupt register can be used to inhibit servicing a particular interrupt multiple times by different threads.

Another advantage of particular embodiments is provided in that the servicing of interrupts in a multi-threaded processing environment can be managed in a simple and efficient manner, by setting interrupt bit flags in a global interrupt register, which may correspond to disabling bits in thread-specific registers.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
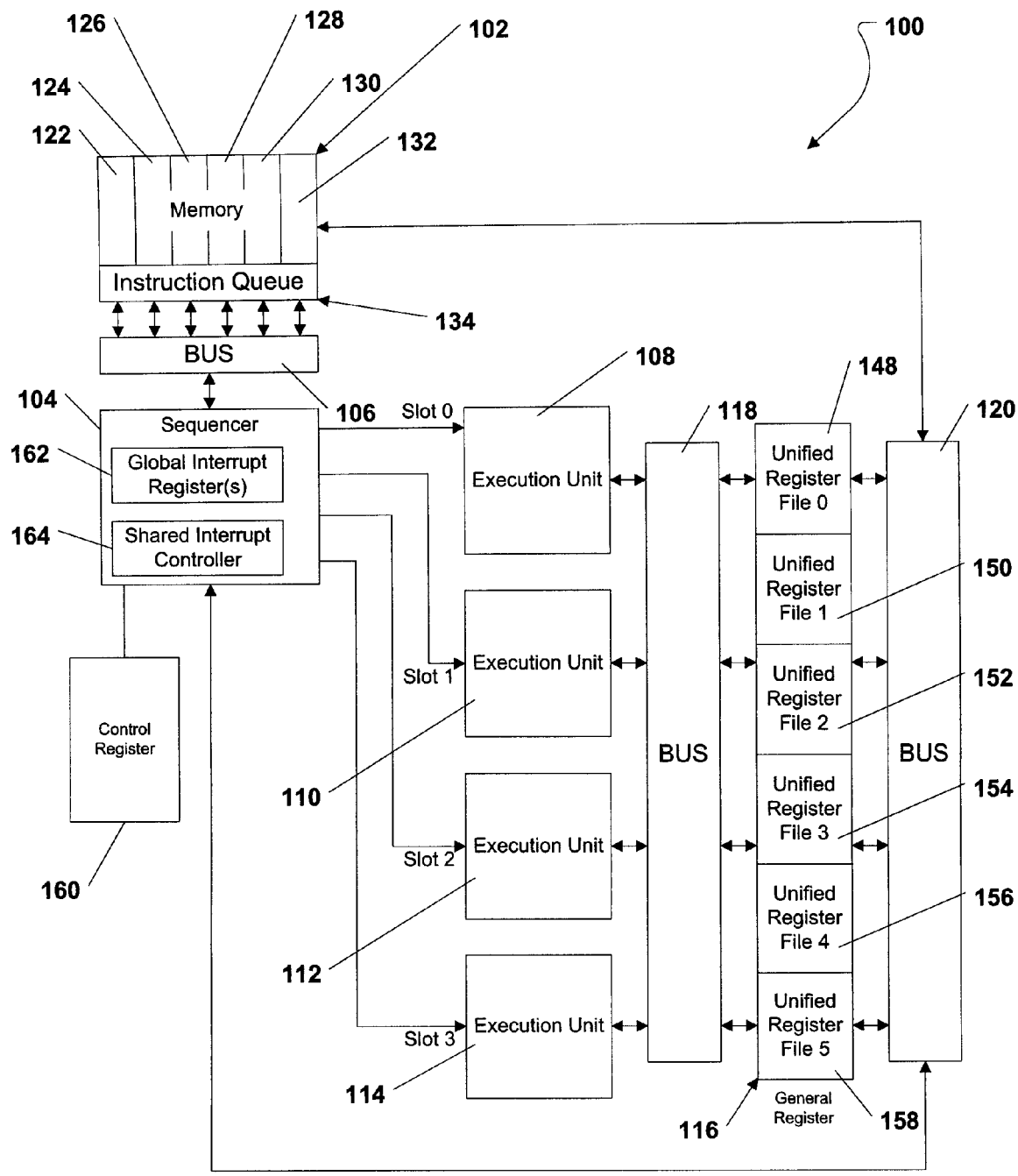
FIG. 1 is a block diagram of a particular illustrative embodiment of a multi-threaded processor including a shared interrupt controller.

Referring to FIG. 1, a multi-threaded processor 100 is disclosed. In a particular illustrative embodiment, the multi-threaded processor 100 may be a digital signal processor. The multi-threaded processor 100 includes a memory 102 having an instruction queue 134, a memory bus 106, a sequencer unit 104, a plurality of execution units 108-114, a first bus 118, a unified register file 116, and a second bus 120. The sequencer 104 is coupled to a control register 160. The sequencer 104 includes a global interrupt register file 162 and a shared interrupt controller 164. The memory 102 is coupled to the second bus 120 and the sequencer 104 is also coupled to the second bus 120.

In a particular embodiment, the memory bus 106 can be a sixty-four (64) bit bus and the sequencer 104 can be configured to retrieve instructions from the memory 102. In a particular illustrative embodiment, each instruction may have a length of thirty-two (32) bits. The sequencer 104 is coupled to a first instruction execution unit 108 via a first path (slot 0), to a second instruction execution unit 110 via a second path (slot 1), to a third instruction execution unit 112 via a third path (slot 2), and to a fourth instruction execution unit 114 via a fourth path (slot 3). Each instruction execution unit 108, 110, 112, and 114 can be coupled to a general register file 116 via the first bus 118. The general register file 116 can also be coupled to the sequencer 104 and to the memory 102 via the second bus 120.

In a particular embodiment, the memory 102 can be a content addressable memory (CAM) that includes a first instruction cache 122, a second instruction cache 124, a third instruction cache 126, a fourth instruction cache 128, a fifth instruction cache 130, and a sixth instruction cache 132. During operation, the sequencer 104 can access each of the instruction caches 122, 124, 126, 128, 130, and 132. Additionally, in a particular embodiment, each instruction cache 122, 124, 126, 128, 130, and 132 includes a plurality of instructions, instruction steering data for each instruction, and instruction pre-decode data for each instruction. The instruction queue 134 in the memory 102 may include an instruction queue for each instruction cache 122, 124, 126, 128, 130, and 132.

As depicted in FIG. 1, the general register 116 includes a first unified register file 148, a second unified register file 150, a third unified register file 152, a fourth unified register file 154, a fifth unified register file 156, and a sixth unified register file 158. Each unified register file 148, 150, 152, 154, 156, and 158 corresponds to a respective instruction cache 122, 124, 126, 128, 130, and 132 within the memory 102. Each unified register file 148, 150, 152, 154, 156, and 158 and the respective instruction caches 122, 124, 126, 128, 130 and 132 correspond to respective threads. Further, in a particular embodiment, each of the unified register file 148, 150, 152, 154, 156, and 158 may have the same construction and may include an equal number of data operands and address operands.

FIG. 1 illustrates that the multi-threaded processor 100 can further include a control register 160 that is coupled to the sequencer 104. As shown, the control register 160 can be a stand-alone register. Alternatively, the control register may be included in the general register 116. As illustrated, the multi-threaded processor 100 can also include control logic, such as the shared interrupt controller 164. In an illustrative embodiment, the shared interrupt controller 164 is coupled to the global interrupt registers 162. The shared interrupt controller 164 may operate to control access by the execution units 108, 110, 112, and 114 to each particular interrupt.

During operation of the multi-threaded processor 100, instructions are fetched from the memory 102 by the sequencer 104, sent to selected instruction execution units 108, 110, 112, and 114, and executed at the instruction execution units 108, 110, 112, and 114. The results from the executed instruction at each instruction execution unit 108, 110, 112, and 114 can be written to the general register 116 (i.e., to one of the unified register files 148, 150, 152, 154, 156, and 158). In a particular embodiment, the multi-threaded processor 100 is capable of executing multiple program threads. Further, in a particular embodiment, the multi-threaded processor 100 can be configured to execute up to six different program threads on an interleaved basis.

The sequencer 104 is adapted to provide instructions associated with one or more threads of the multi-threaded processor 100. The sequencer 104 includes the interrupt controller 164, which is adapted to receive one or more interrupts. The one or more interrupts may represent hardware signals that can cause a thread of the multi-threaded processor 100 to set aside normal processing and begin execution of an interrupt handler, which may be a software routine for responding to a particular interrupt. Such interrupts may be generated from instruction execution, from peripheral devices, from circuit components, or any combination thereof. An interrupt can be parameterized by the type of bus and the interrupt level and can include an interrupt vector number.

In a particular illustrative embodiment, when one or more interrupts are received or detected by the shared interrupt controller 164, the shared interrupt controller 164 is adapted to selectively allow a first thread of the one or more threads to service a particular interrupt of the one or more interrupts. In a particular embodiment, the interrupt controller 164 includes logic to preclude a second thread from responding to the particular interrupt after the particular interrupt is selected for service by the first thread.

In a particular embodiment, the shared interrupt controller 164 is shared across multiple execution units and multiple threads. The shared interrupt controller 164 can include multiple operating modes, which may be configured for each of the multiple execution units. A first operating mode includes an interrupt active high-edge trigger mode, where the shared interrupt controller 164 is responsive to an interrupt at a logic high level that is triggered by an edge transition from a logic-low to a logic-high level. A second operating mode includes an interrupt active low edge trigger mode, where the shared interrupt controller 164 is responsive to an interrupt at a logic low level that is triggered by an edge transition from a logic-high to a logic-low level. A third operating mode includes an active high level trigger mode, where the interrupt controller 164 is responsive to an interrupt that is maintained at a logic high level. A fourth operating mode includes a logic low-level triggered mode, where the shared interrupt controller 164 is responsive to an interrupt that is maintained at a logic low level.

Figure 2:
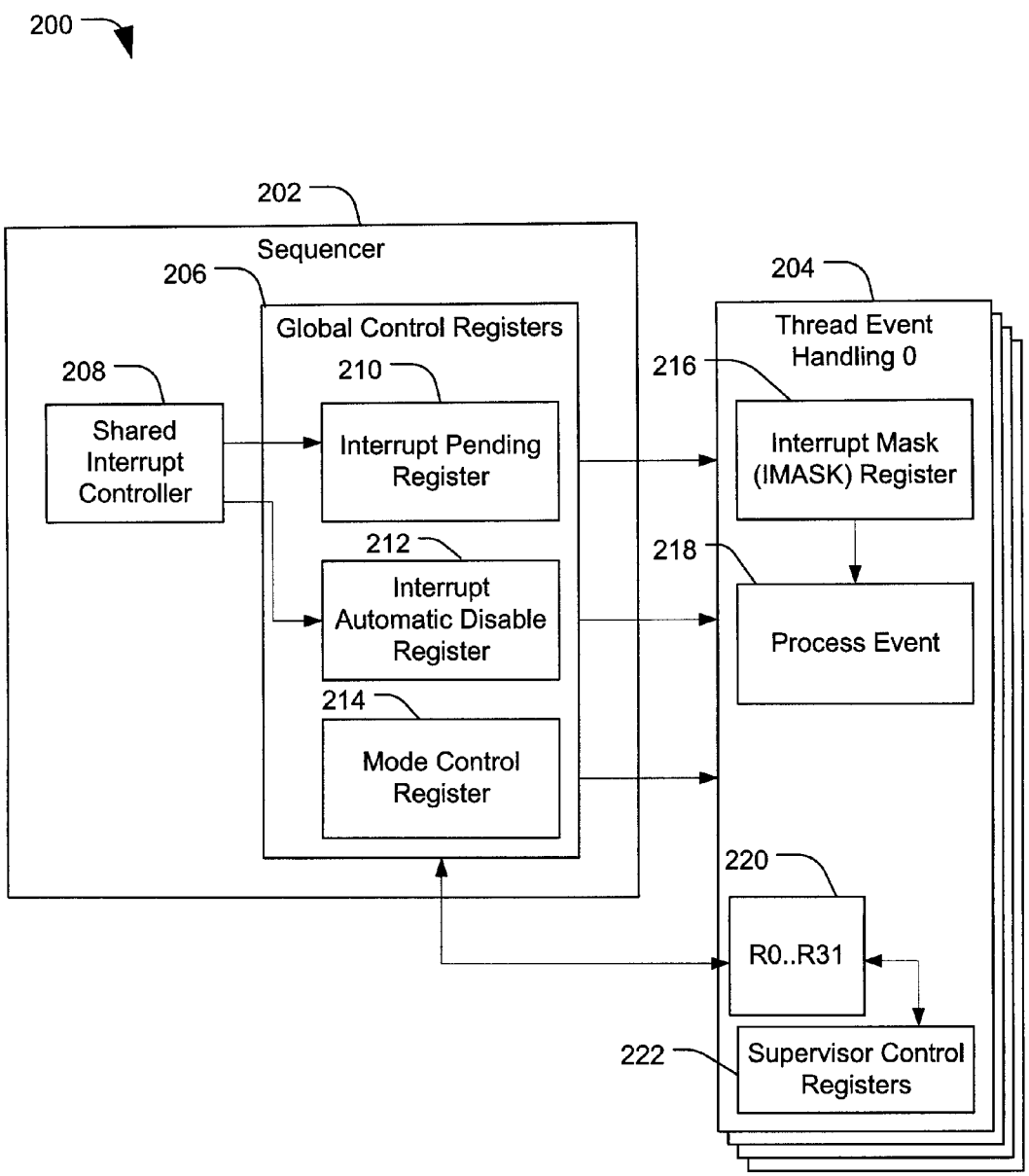
FIG. 2 is a block diagram of a second particular illustrative embodiment of a multi-threaded processor including a shared interrupt controller.

In a particular embodiment, the shared interrupt controller 164 includes logic to set or alter a flag in the global interrupt register 162 and in an interrupt pending register (such as the interrupt pending register (IPEND) 210 illustrated in FIG. 2). The global interrupt register 162 may also include an interrupt automatic disable register, such as the interrupt automatic disable register 212 in FIG. 2 and 324 in FIG. 3. The flag may be set in the global interrupt register 162 to indicate that a particular thread is servicing a particular interrupt. In general, each flag corresponds to at least one of the one or more interrupts that may be serviced. The shared interrupt controller 164 is adapted to prevent another thread from servicing the particular interrupt while a particular authorized thread is servicing the interrupt. Once the flag is set for the first thread, the control logic of the shared interrupt controller 164 blocks any other thread, such as a second thread, from responding to the interrupt until the first thread has completed servicing of such interrupt. In addition, the shared interrupt controller 164 can maintain a state of a particular bit corresponding to the interrupt in the global interrupt register 162 while the interrupt is being serviced.

The global interrupt register 162 is accessible to each thread of the multiple threads that is available to take an interrupt. When the multi-threaded processor 100 is operating in a level triggered mode, such as the third and fourth modes described above, the shared interrupt controller 164 can maintain bits within the global interrupt register 162 when a first thread is serving a particular interrupt. Logic associated with the shared interrupt controller 164 can inhibit other threads from servicing the particular interrupt while the interrupt is being serviced, thereby preventing servicing the interrupt multiple times. The shared interrupt controller 164 includes logic to control a least one bit of the interrupt pending registers to indicate when a particular thread is servicing an interrupt. In a particular embodiment, the control bit in the interrupt pending register is cleared automatically when the particular interrupt being serviced by the associated thread is de-asserted.

Referring to FIG. 2, further details regarding a sequencer, logic, and associated registers for handling thread events and interrupts in a multi-threaded processor 200 is shown. The multi-threaded processor 200 includes a sequencer 202 and thread event handling logic 204. The sequencer 202 includes a shared interrupt controller 208 and global control registers 206. The global control registers 206 include an interrupt pending register 210, an interrupt automatic disable register 212, and a mode control register 214. The sequencer 202 communicates with the thread event handling modules 204, which may include a thread event-handling module that corresponds to each thread of a multi-threaded processor. Each thread event-handling module 204 includes an interrupt mask register 216, a process event register 218, a plurality of general purpose registers 220 (R0-R31), and supervisor control registers 222.

In a particular embodiment, the global interrupt registers 206 are responsive to one or more interrupt sources to receive one or more interrupts. The one or more interrupt sources may be instructions executed by a particular execution unit of a processor, may be peripheral devices that require attention, or any combination thereof. The global interrupt register 206 is accessible by each thread of a plurality of available threads of the multi-threaded processor 200 to service the one or more interrupts.

In general, the interrupt automatic disable register 212 includes multiple bits that may be set to inhibit access to a particular interrupt. The interrupt automatic disable register 212 may automatically set a bit flag corresponding to a particular interrupt when a thread of the multi-threaded processor 200 begins servicing the interrupt. The bit flag of the interrupt automatic disable register 212 may correspond to a bit of the global interrupt register 206. Additionally, the bit flag of the interrupt automatic disable register 212 can be controlled by the shared interrupt controller 208 to maintain a state of the bit flag until servicing of the interrupt is completed.

The shared interrupt controller 208 includes interrupt logic coupled to the global interrupt register 206. The interrupt logic of the shared interrupt controller 208 is to determine that a particular interrupt of one of a plurality of potential interrupts is being serviced by a particular thread of the multi-threaded processor. The shared interrupt controller 208 prevents access to the service interrupt by other threads of the plurality of available threads based on a determination that the interrupt is being serviced by a first thread. In a particular illustrative embodiment, the shared interrupt controller 208 may utilize the bit flag of the interrupt automatic disable register 212 to restrict access to a particular interrupt once the interrupt is being serviced. For example, once a particular thread is servicing a particular interrupt, additional threads can be prevented from accessing the particular interrupt, thereby providing an interrupt service blocking capability.

In a particular illustrative embodiment, the interrupt automatic disable register 212 is accessible by the shared interrupt controller 208 to set a selected bit of the plurality of bits associated with a particular interrupt to be serviced. The selected bit indicates that an interrupt is being serviced and the logic within the shared interrupt controller 208 prevents other threads from accessing the interrupt while the interrupt is being serviced. In a particular alternative embodiment, the blocking logic to prevent other threads from accessing or servicing the selected interrupt when the selected bit is set may be provided within the interrupt automatic disable register 212 or in another location associated therewith.

The shared interrupt controller 208 may include logic adapted to receive an instruction to clear the selected bit within the interrupt automatic disable register 212 after the particular interrupt is de-asserted. For example, an interrupt may be asserted when a buffer is full. For example, a device receiving data from a network may raise an interrupt when its buffer is full and may de-assert the interrupt when the buffer has been emptied. If the interrupt is a logic high signal, for example, the peripheral device may alter a logic level of the interrupt to a logic low signal, thereby de-asserting the interrupt. The shared interrupt controller 208 can clear the selected bit in response to the de-asserted interrupt, in response to a servicing complete indication from the execution unit, in response to receiving a clear bit instruction, or any combination thereof. In another particular illustrative embodiment, the execution unit may automatically clear a bit in the interrupt pending register 210 when the interrupt has been serviced.

The interrupt pending register 210 also includes a plurality of bits. Each bit of the plurality of bits of the interrupt pending register 210 indicates a status of a particular interrupt of the multi-threaded processor 200. The interrupt pending register 210 may be accessible to peripheral devices or to software to determine a status associated with a particular interrupt. Additionally, the interrupt logic of the shared interrupt controller 208 has access to the interrupt pending register 210 to set or to clear a selected bit corresponding to the particular interrupt. In a particular illustrative embodiment, the detected interrupt may be a software interrupt represented by a flag stored in the interrupt pending register 210. The particular flag in the interrupt pending register 210 may be accessible to software to allow the software to provide status indicators for the asserted software interrupt.

For example, a "new hardware detected" type of status indicator associated with a peripheral device may be provided as a pop-up indicator within a software application (such as operating system software of a computing device) that is executed by the multi-threaded processor 200. The multi-threaded processor 200 may service the new hardware detected interrupt, run a new hardware installation routine, and clear the flag upon successful installation. The installation process and the successful installation may be reflected by bits within the interrupt pending register 210, which may be reflected by the software application in a popup or other indicator. The status may be determined by the software based on the status of particular flags within the interrupt pending register 210.

Figure 3:
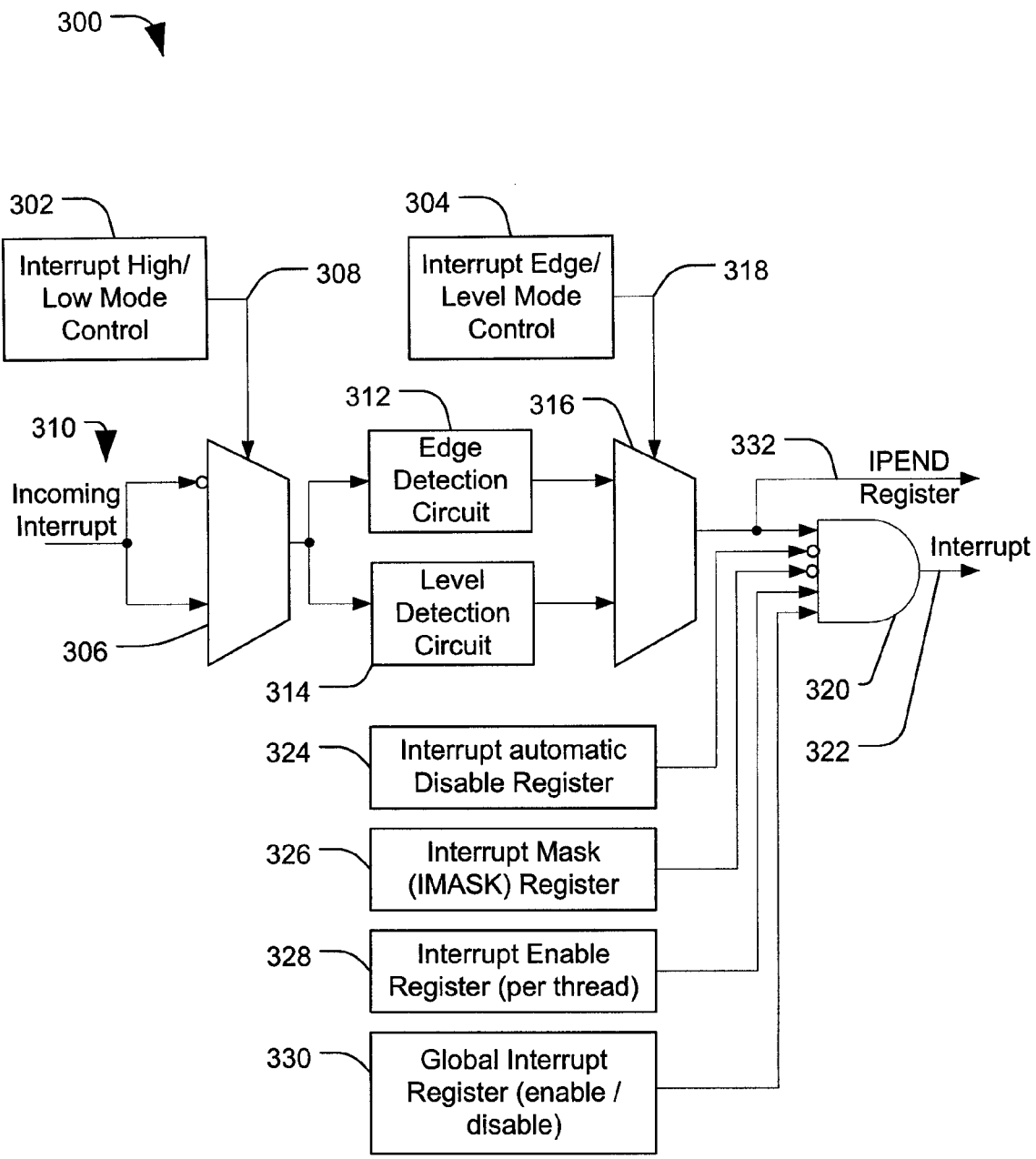
FIG. 3 is a block diagram of a particular illustrative embodiment of a shared interrupt controller.

Referring to FIG. 3, certain functionality for handling interrupts of an interrupt controller 300 is illustrated. The system includes a first selector 306, a second selector 316, an interrupt output 322, and an interrupt pending register output 332. The first selector 306 may be a multiplexer to receive a control signal from an interrupt high/low mode control module 302 via a control input 308. The second selector 316 may be a multiplexer to receive a control signal from an interrupt edge/level mode control 304 via a second control input 318. The first selector 306 is responsive to an incoming interrupt 310 and provides an output to an edge detection circuit 312 and to a level detection circuit 314. The outputs of the edge and level detection circuits 312 and 314 are provided to the second selector 316 and selected based on the second control input 318 from the interrupt edge/level mode control 304. The detected edge or level associated with the incoming interrupt 310 is provided to a logic circuit 320, such as a logical AND gate. The output may also be provided to an interrupt pending register via the interrupt pending register output 332.

The interrupt controller 300 also includes an interrupt automatic disable register 324, an interrupt mask (IMASK) register 326, an interrupt enable register per thread 328, and a global interrupt register enable/disable register 330. The automatic disable register 324 may include a bit that is set automatically when an interrupt is taken (i.e., is being serviced) by a thread of a multi-threaded processor. The IMASK register 326 may include bits that can be set by software to direct particular interrupts to particular hardware threads. The logic circuit 320 is responsive to the interrupt automatic disable register 324, the IMASK register 326, the interrupt enable register per thread 328, and the global interrupt enable/disable register 330 to selectively provide the detected edge or level of the incoming interrupt 310 to the interrupt output 322.

In a particular illustrative embodiment, an incoming interrupt 310 is received at the first selector 306, which may be a multiplexer circuit. The incoming interrupt 310 is received at both a positive input and an inverted input as shown. The first selector 306 is controlled by the interrupt high/low mode control unit 302 via the control signal 308 to selectively provide either the positive input or the inverted input to the edge detection circuit 312 and to the level detection circuit. The high/low operating mode for interrupt control dictates the output of the incoming interrupt 310 being provided to the edge detection circuit 312 and to the level detection circuit 314. The outputs from the edge detection circuit 312 and the level detection circuit 314 are provided to the second selector 316. The second selector 316 is responsive to a control input from the interrupt edge/level mode control unit 304 via control signal 318 to selectively provide one of the outputs from either the edge detection circuit 312 or the level detection circuit 314 to an input of the logic circuit 320. The output of the second selector 316 is also provided to the interrupt pending register output 332. A combination of the signals from the interrupt automatic disable register 324, the IMASK register 326, the interrupt and enable register per thread 328, and the global interrupt register enable/disable register 330 determines whether or not the interrupt signal is provided at output 322.

In general, the interrupt high/low mode control circuit 302 and the interrupt edge/level mode control circuit 304 cooperate to control the first and second selectors 306 and 316 to control an operating mode of the interrupt control circuit 300. In general, the interrupt control circuit 300 may handle interrupts using one of four modes: an interrupt high-edge detection mode that responds to interrupts at a low-to-high edge transition; an interrupt high-level detection mode that responds to interrupts at a logic high value; an interrupt low-edge detection mode that responds to interrupts at a high-to-low edge transition; and an interrupt low-level detection mode that responds to interrupts at a logic low value. The interrupt automatic disable register 324 may include a flag bit that may be set to provide a logic low signal to the logic gate 320 to prevent the output of the second selector 316 from reaching the interrupt output 322, when the interrupt is being serviced by another thread of a multi-threaded processor. Additionally, the global interrupt register enable/disable 330 may provide a bit flag indicating that another thread is servicing the interrupt to the logic gate 320 to prevent the output of the second selector 316 from reaching the interrupt output 322. Thus, the global interrupt register 330 and the interrupt automatic disable register 324 may cooperate to prevent multiple threads of a multi-threaded processor from servicing the same interrupt. Additionally, the interrupt automatic disable register 324 may be responsive to fields or bits within the global interrupt register 330 to clear flags within the interrupt automatic disable register 324 when a corresponding bit of the global interrupt register 330 is set. Alternatively, the interrupt automatic disable register 324 may include a thread specific bit that enables a particular register to continue to access a particular interrupt that it is servicing, even when a corresponding bit of the global interrupt register 330 changes to prevent other threads from accessing the serviced interrupt.

In a particular illustrative embodiment, a signal at the interrupt output 322 may be determined by a logical operation performed by the logic gate 320 on the detected interrupt at the output of the second selector 316 in connection with the interrupt automatic disable register 324, the IMASK register 326, the interrupt enable register (per thread) 328, and the global interrupt register (enable/disable) 330. For example, by controlling the bits in the interrupt automatic disable register 324, the IMASK register 326, the interrupt enable register 328, and the global interrupt register 330 and by performing a logical AND operation using the logic gate 320, the interrupt output 322 may be controlled to provide the incoming interrupt 310 at the interrupt output 322 only when particular conditions are met. In this manner, once a particular thread begins servicing an interrupt, the interrupt controller 300 can prevent other threads from receiving the interrupt. In a particular illustrative embodiment, the interrupt enable register 328, the IMASK register 326, and the interrupt automatic disable register 324 may represent per thread control registers, while the global interrupt register 330 may be shared.

In a particular illustrative embodiment, a multi-threaded processor may include a plurality of execution units for processing multiple instruction threads. The multi-threaded processor may include the interrupt controller 300 for processing interrupts received from peripheral devices, instruction execution units, other circuit components, or any combination thereof. The interrupt controller 300 may include a first configuration register, such as the interrupt high/low mode control register 302, indicating an interrupt logic level (i.e., a high logic level or a low logic level). The interrupt controller 300 may also include a second configuration register, such as the interrupt edge/level mode control register 304, indicating an interrupt trigger (i.e., an edge trigger or a level trigger). The interrupt controller 300 may also include an automatic disable interrupt register 324 including a plurality of bits, where each bit of the plurality of bits corresponds to a particular interrupt. The interrupt controller 300 may also include processing logic, such as the first selector 306, the second selector 316, the edge detection circuit 312, the level detection circuit 314, and the logic gate 320 to selectively provide a received interrupt (e.g., the incoming interrupt 310) to a first thread of the multi-threaded processor based on the interrupt logic level, the interrupt trigger, and a bit corresponding to the particular interrupt. The interrupt controller 300 or the interrupt automatic disable register 324 may also include logic to set the bit corresponding to the particular interrupt when the particular interrupt is being serviced by the first thread. The processing logic, including the logic gate 320, may cooperate to prevent access by other threads of the plurality of execution threads while the first thread is servicing the particular interrupt.

Figure 4:
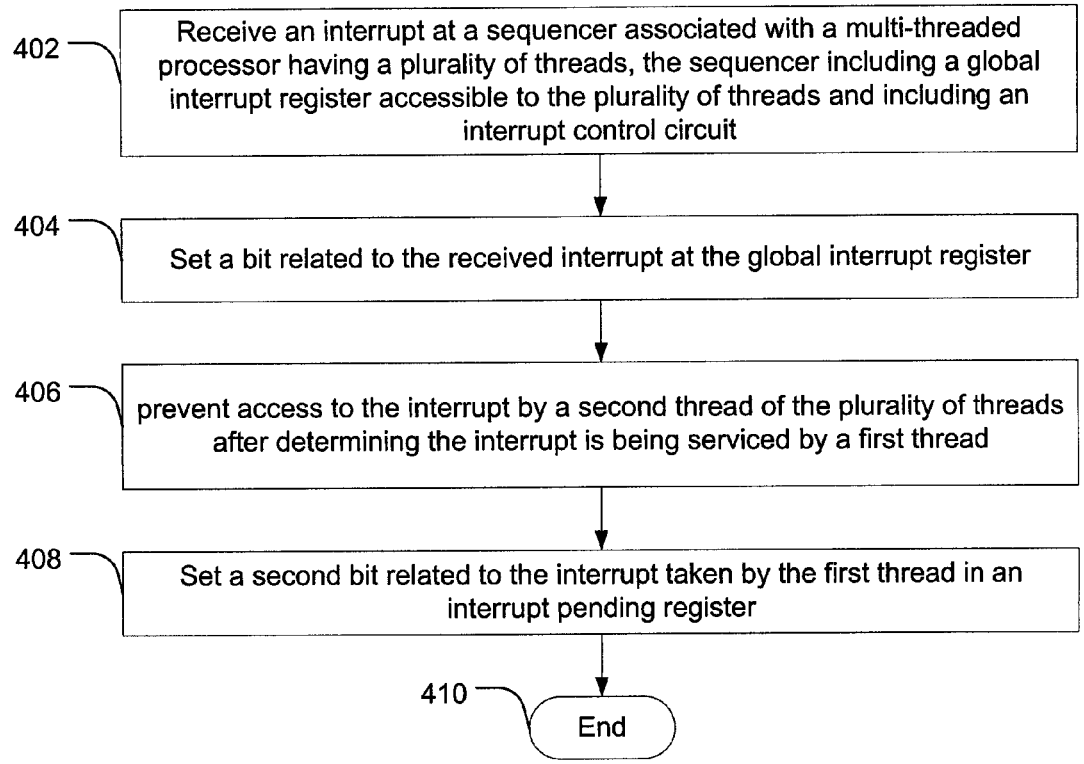
FIG. 4 is a flow diagram of a particular illustrative embodiment of a method of handling interrupts using a shared interrupt controller.

Referring to FIG. 4, a method of operating of a multi-threaded processor including a shared interrupt controller is illustrated. The method includes receiving an interrupt at a sequencer associated with the multi-threaded processor having a plurality of threads, as shown at 402. The sequencer includes a global interrupt register accessible to the plurality of threads and includes an interrupt control circuit. The method further includes setting a bit related to the received interrupt at the global interrupt register, at 404. Proceeding to 406, the method includes preventing access to the interrupt by a second thread of the plurality of threads after determining that the first thread is servicing the interrupt. In a particular illustrative embodiment, the sequencer may include a shared interrupt controller adapted to maintain a state of selected bits within the global interrupt register. Additionally, the shared interrupt controller may be adapted to set a bit flag in an interrupt automatic disable register, which may be used in a logical operation to prevent other threads of the multi-threaded processor from servicing the interrupt when a first thread is already servicing the interrupt. Continuing to 408, the method further includes setting a second bit related to the interrupt taken by the first thread in an interrupt pending register. The interrupt pending register may be accessible to a particular execution unit, to software processes, or any combination thereof. In a particular embodiment, software processes may access bits within the interrupt pending register to determine a status of the interrupt processing and to provide visual indicators to a user, for example. The method is terminated at 410.

While reference is made at 406 to preventing access to the second thread, it should be understood that the shared interrupt controller may prevent access to a particular interrupt either to a particular thread or to all other threads while the first thread is servicing the particular interrupt. In addition, the bit is set in the interrupt pending register to indicate the first thread is servicing the interrupt. The bit set in the interrupt pending register may be cleared after a clear flag instruction is received that is related to an interrupt flag in the global interrupt register. A corresponding flag of an automatic disable register may also be cleared when the clear flag instruction is processed. The interrupt automatic disable register may be used to prevent access to the interrupt based on the bit set in the corresponding global interrupt register. In general, a shared interrupt controller and a global interrupt register may be utilized to control access to a particular interrupt by a plurality of threads of a multi-threaded processor. In this manner, a first thread can service a particular interrupt, and other threads are then prevented from accessing the particular interrupt.

Figure 5:
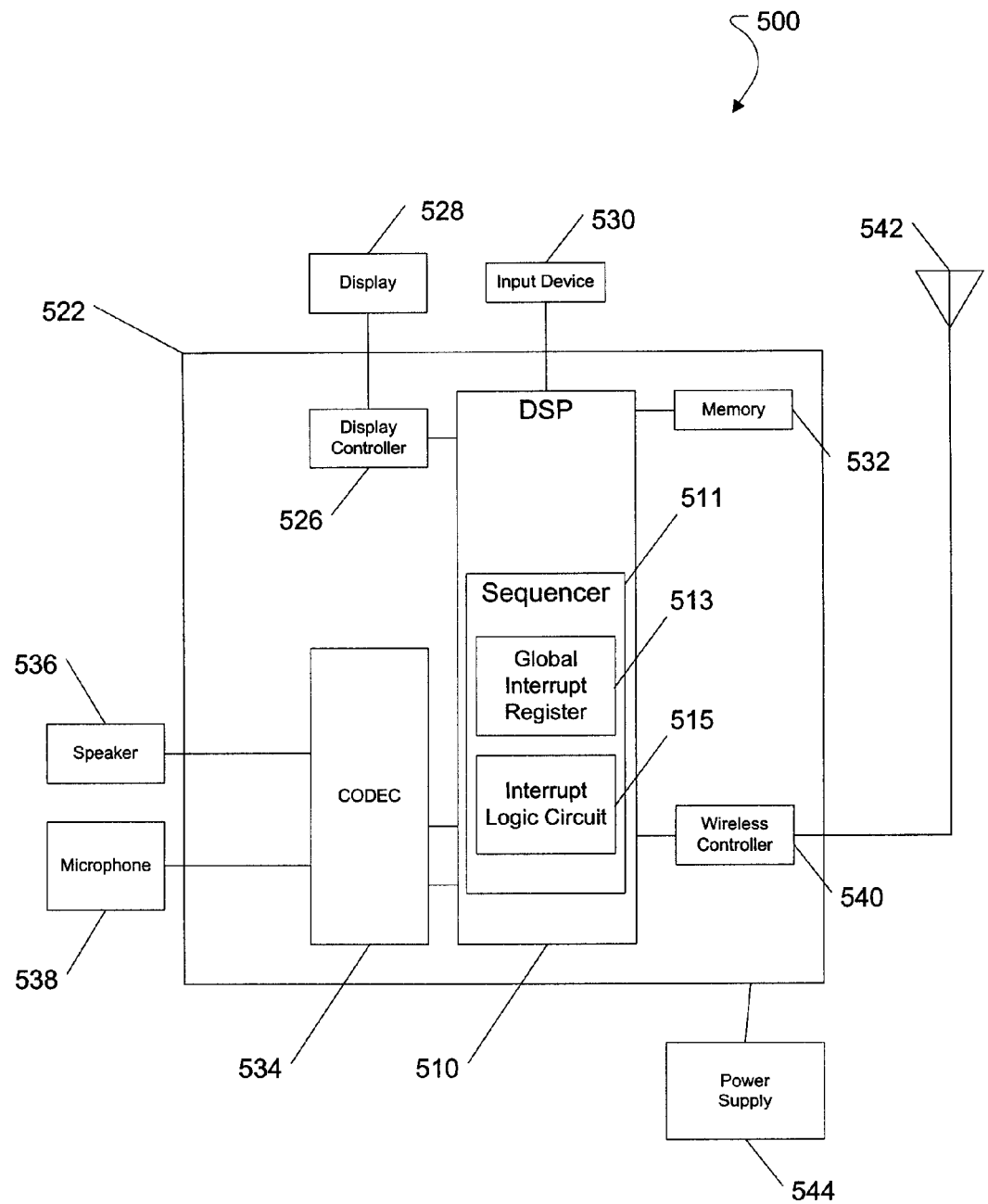
FIG. 5 is a block diagram of a particular illustrative embodiment of a wireless communications device.

Referring to FIG. 5, a wireless communication device 500 is shown. The wireless communication device 500 includes a wireless controller 540 and an associated transceiver to communicate with a communication network via an antenna 542. The wireless communication device 500 also includes a memory 532 that includes a plurality of instructions executable by a processor such as the digital signal processor 510. The processor is coupled to the transceiver and has access to the memory 532. The processor includes a plurality of execution units adapted to execute selected instructions. In a particular embodiment, the processor 510 is a multi-threaded processor that includes a sequencer 511. The sequencer includes a global interrupt register 513 and includes an interrupt logic circuit 515. The sequencer 511 is adapted to retrieve and provide selected instructions to a plurality of execution units of the digital signal processor 510. The interrupt logic circuit 515 is coupled to the global interrupt register 513 and is adapted to determine when a particular thread of the digital signal processor 510 is servicing an interrupt. The interrupt logic circuit 515 is adapted to utilize the global interrupt register 513 to prevent access to the interrupt by other threads. In another embodiment, the global interrupt register 513 includes an interrupt automatic disable register (IAD). The IAD register can include a plurality of bits related to a corresponding plurality of interrupts. The interrupt logic circuit 515 is adapted to access a bit of the plurality of bits within the IAD register when a thread is servicing the corresponding interrupt associated therewith.

FIG. 5 also shows a display controller 526 that is coupled to the digital signal processor 510 and to a display 528. Moreover, an input device 530 is coupled to the digital signal processor 510. A coder/decoder (CODEC) 534 can also be coupled to the digital signal processor 510. A speaker 536 and a microphone 538 can be coupled to the CODEC 534.

FIG. 5 also indicates that a wireless controller 540 can be coupled to the digital signal processor 510 and to a wireless antenna 542. In a particular embodiment, a power supply 544 is coupled to the on-chip system 522. Moreover, in a particular embodiment, as illustrated in FIG. 5, the display 528, the input device 530, the speaker 536, the microphone 538, the wireless antenna 542, and the power supply 544 are external to the on-chip system 522. However, each is coupled to a component of the on-chip system 522.

It should be understood that while the sequencer 511, the global interrupt register 513, and the interrupt logic circuit 515 are shown only within the digital signal processor 510, the sequencer 511, the global interrupt register 513, and the interrupt logic circuit 515 may be provided in other components, including control elements, general purpose processing circuits, or any other component that includes multi-threaded processor functionality.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. An apparatus comprising:
    a hardware multi-threaded processor comprising:
        a plurality of threads, wherein each of the plurality of threads is enabled to service an interrupt;
        a first configuration register indicating an interrupt logic level;
        a second configuration register indicating an interrupt trigger; and
        an automatic disable interrupt register including a plurality of bits, each bit of the plurality of bits associated with a corresponding interrupt of a plurality of interrupts; and
    processing logic comprising:
        a first multiplexer including an interrupt input, an output, and an interrupt logic level select input responsive to the first configuration register to selectively output the first interrupt at the output, wherein the first interrupt is received at the interrupt input;
        an edge detection circuit coupled to the output and configured to detect a rising or falling edge of the first interrupt; and
        a level detection circuit coupled to the output and adapted to detect a logic level associate with the first interrupt;
    wherein the processing logic is configured to:
        receive a first interrupt;
        select a first thread of the plurality of threads, wherein the first thread is selected based on the interrupt logic level, the interrupt trigger, and a first bit of the plurality of bits of the automatic disable interrupt register, wherein the first bit of the plurality of bits corresponds to the first interrupt;
        provide access by the first thread to the first interrupt of the plurality of interrupts;
        set the first bit of the plurality of bits of the automatic disable interrupt register while the first interrupt is being serviced by the first thread; and
        prevent access to the first interrupt by a second thread of the plurality of threads while the first interrupt is being serviced by the first thread of the plurality of threads.

2. The apparatus of claim 1, wherein the processing logic further comprises a second multiplexer including a second interrupt input, a second output, and an interrupt trigger selection input responsive to the second configuration register to selectively provide data related to the first interrupt to the second output.

3. The apparatus of claim 1, wherein the first interrupt is received from an external source.

* * * * *